United States Patent
Bedingfield, Sr.

(10) Patent No.: US 9,015,241 B2
(45) Date of Patent: Apr. 21, 2015

(54) APPARATUS AND METHOD FOR VIDEO CONFERENCING

(75) Inventor: James Carlton Bedingfield, Sr., Lilburn, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 804 days.

(21) Appl. No.: 12/640,715

(22) Filed: Dec. 17, 2009

(65) Prior Publication Data

US 2011/0153738 A1   Jun. 23, 2011

(51) Int. Cl.
| | |
|---|---|
| G06F 15/16 | (2006.01) |
| H04N 7/14 | (2006.01) |
| H04N 5/235 | (2006.01) |
| H04N 21/422 | (2011.01) |
| H04N 21/4223 | (2011.01) |
| H04N 21/436 | (2011.01) |
| H04N 21/4788 | (2011.01) |
| H04L 29/06 | (2006.01) |

(52) U.S. Cl.
CPC .............. *H04N 7/142* (2013.01); *H04N 5/2354* (2013.01); *H04N 7/147* (2013.01); *H04N 21/42202* (2013.01); *H04N 21/4223* (2013.01); *H04N 21/43615* (2013.01); *H04N 21/4788* (2013.01); *H04L 65/1096* (2013.01); *H04L 65/403* (2013.01)

(58) Field of Classification Search
CPC ......... H04N 7/15; H04N 7/147; H04N 7/148; H04N 7/155; H04N 21/4223; H04N 21/4788; G06T 15/50; G06T 15/506; H06L 67/125; G06B 15/02; G06B 15/03; G06B 15/035
USPC ........ 709/204; 382/274; 348/231.6; 345/426, 345/594; 362/85, 233, 260
See application file for complete search history.

(56) References Cited

U.S. PATENT DOCUMENTS

| | | | |
|---|---|---|---|
| 6,980,697 B1 * | 12/2005 | Basso et al. | 382/274 |
| 7,057,649 B2 * | 6/2006 | Caci | 348/231.6 |
| 7,589,723 B2 * | 9/2009 | Wang et al. | 345/426 |
| 2003/0050737 A1 * | 3/2003 | Osann, Jr. | 700/276 |
| 2003/0151909 A1 * | 8/2003 | Sid | 362/85 |
| 2004/0148197 A1 * | 7/2004 | Kerr et al. | 705/2 |
| 2005/0195330 A1 * | 9/2005 | Zacks et al. | 348/564 |
| 2006/0290710 A1 * | 12/2006 | Zwanenburg | 345/594 |
| 2008/0024674 A1 * | 1/2008 | Park | 348/687 |
| 2008/0266294 A1 * | 10/2008 | Osman | 345/426 |
| 2009/0172756 A1 * | 7/2009 | Wheatley et al. | 725/106 |
| 2010/0066808 A1 * | 3/2010 | Tucker et al. | 348/14.09 |
| 2010/0141153 A1 * | 6/2010 | Recker et al. | 315/149 |

* cited by examiner

*Primary Examiner* — Thuong Nguyen
(74) *Attorney, Agent, or Firm* — Guntin & Gust, PLC; Joseph Hrutka (57) ABSTRACT

A system that incorporates teachings of the present disclosure may include, for example, an apparatus having a controller to capture one or more images of a conference room using a video camera, generate an illumination model for a plurality of lights associated with the conference room based on the images, and illuminate at least a portion of the lights based on the illumination model during a video conference call that utilizes the video camera, where the video conference call is implemented using an interactive television network. Other embodiments are disclosed.

20 Claims, 5 Drawing Sheets

APPARATUS AND METHOD FOR VIDEO CONFERENCING

FIELD OF THE DISCLOSURE

The present disclosure relates generally to communication systems and more specifically to an apparatus and method for video conferencing.

BACKGROUND

Video conferencing is becoming more popular as a means of communications due in part to the ability to communicate through that which is seen and heard as opposed to being limited to that which is only heard. The quality of the video images that are displayed can be significant to the viewer's overall conference experience.

DETAILED DESCRIPTION

One embodiment of the present disclosure can entail a computer-readable storage medium comprising computer instructions to illuminate a plurality of lights in a conference room where the illumination is performed individually in sequence, capture images of the conference room for each of the sequences where the images are captured by a video camera, determine a lighting contribution for each of the lights based on the captured images, generate an illumination model based on the lighting contribution for each of the lights, and illuminate at least a portion of the lights based on the illumination model during a video conference call that utilizes the video camera, where the video conference call is implemented using an interactive television network.

Another embodiment of the present disclosure can entail an apparatus comprising a controller to capture one or more images of a conference room using a video camera, generate an illumination model for a plurality of lights associated with the conference room based on the images, and illuminate at least a portion of the lights based on the illumination model during a video conference call that utilizes the video camera, where the video conference call is implemented using an interactive television network.

Yet another embodiment of the present disclosure can entail a method including capturing one or more images of a conference room using a video camera where the video camera is adapted for use in conducting a video conference call, determining a lighting contribution for each of a plurality of lights associated with the conference room based on the images, and generating an illumination model for the plurality of lights based on the lighting contribution.

Figure 1:
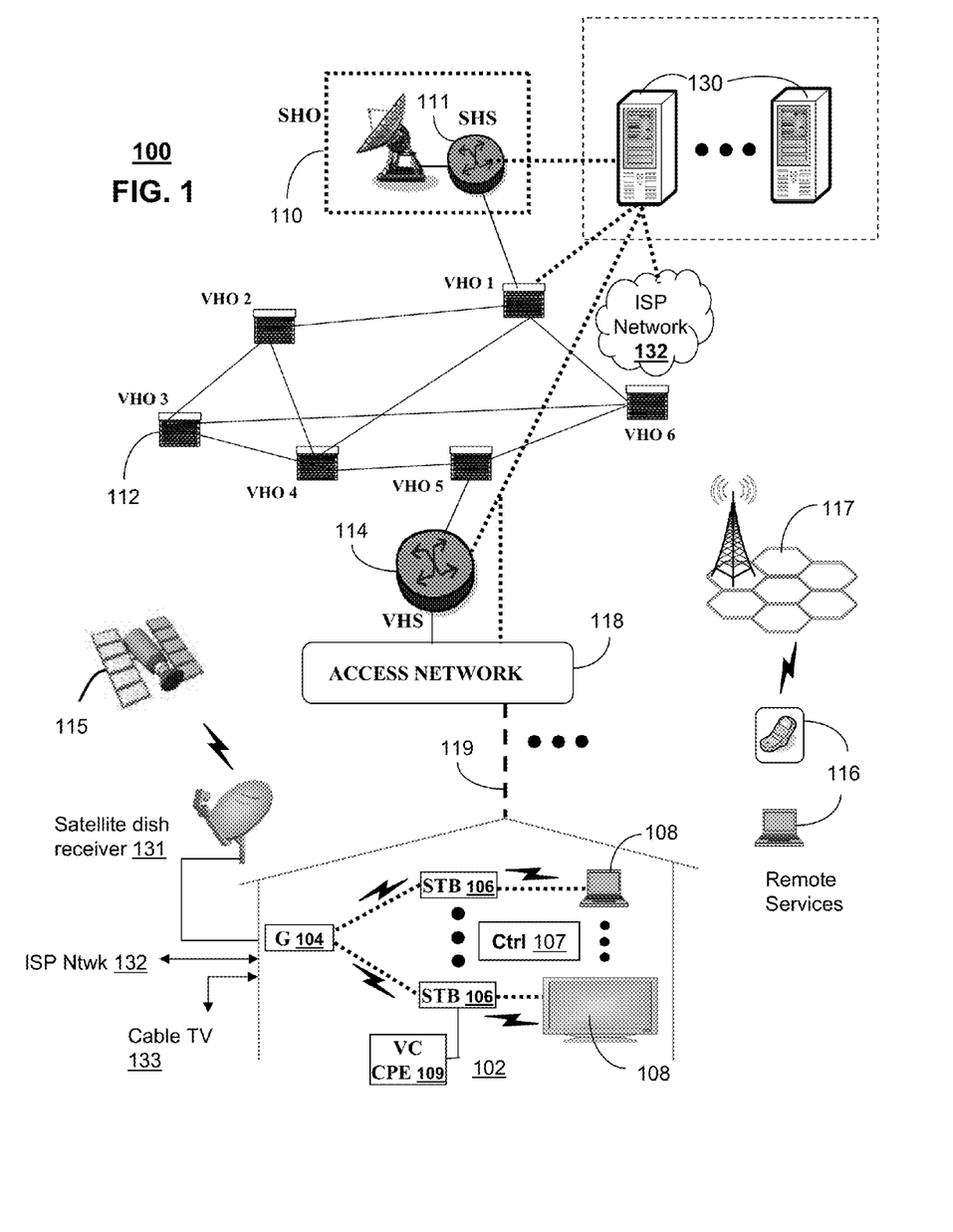
FIG. 1 depicts an illustrative embodiment of a communication system that provides media services.

FIG. 1 depicts an illustrative embodiment of a first communication system 100 for delivering media content. The communication system 100 can represent an Internet Protocol Television (IPTV) broadcast media system. The IPTV media system can include a super hub office (SHO) 110 with at least one super hub office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

In one embodiment, a video conferencing component or device 109 can be provided in communication with the STB 106, which allows for a video conference to be held using the display device (e.g., TV) 108. The device 109 can be a separate component that is coupled via wireline and/or wireless link with the STB 106. In another embodiment, the device 109 can be integrally formed with the STB 106.

The video conferencing device 109 can include or be operably connected with a video camera for capturing the video and audio and then transmitting those signals to the other parties to the conference, such as over an IPTV or other interactive network using the STB 106 and gateway 104. The video conferencing device 109 can include a controller for determining lighting requirements and adjusting lights accordingly. In one embodiment, the device 109 is in communication with one or more lights, such as via Power Line Communication (PLC) techniques. However, the present disclosure contemplates various forms of communication between the lights and the device 109, including wireless and/or hardwire links.

The video conferencing device 109 can make adjustments to the lights using a number of techniques. For instance, the device 109 can measure light contributions from each of the lights, such as through cycling through each light individually and imaging the location during the cycling. The device 109 can also capture an image of the location at the start of the video conference and utilize that image to determine the lighting contributions. In one embodiment, the imaging performed by the device 109 can be utilized for turning on the lights, such as capturing an image when a video conference call is received and determining from the image through use of video pattern recognition whether anyone is present in the location to receive the video conference call.

Figure 2:
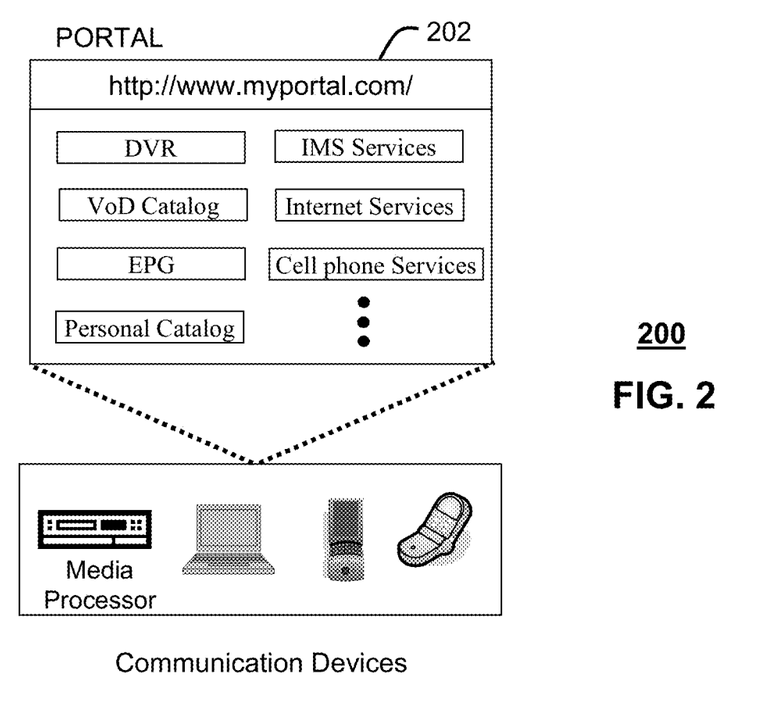
FIG. 2 depicts an illustrative embodiment of a portal interacting with the communication system of FIG. 1.

FIG. 2 depicts an illustrative embodiment of a portal 202 which can operate from the computing devices 130 described earlier of communication system 100 illustrated in FIG. 1. The portal 202 can be used for managing services of communication system 100. The portal 202 can be accessed by a Uniform Resource Locator (URL) with a common Internet browser such as Microsoft's Internet Explorer™ using an Internet-capable communication device such as those described for FIG. 1. The portal 202 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 3:
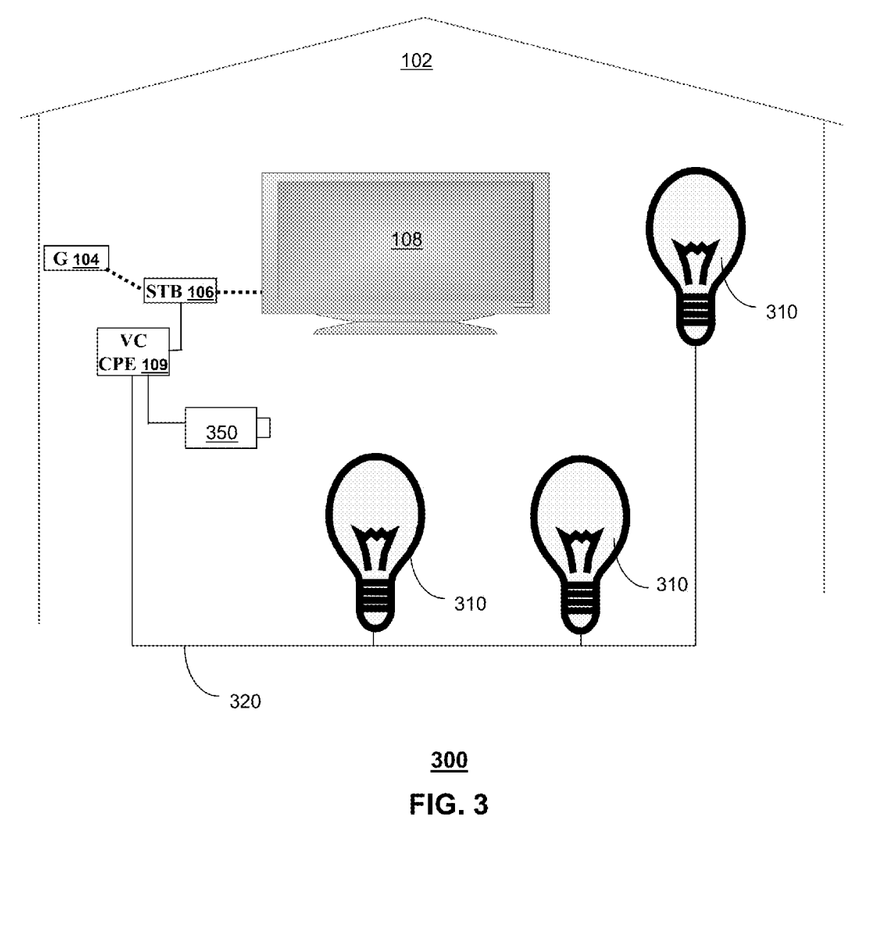
FIG. 3 depicts an illustrative embodiment of a communication system that provides media services.

FIG. 3 depicts an exemplary embodiment of a communication system 300 for delivering media content and providing video conferencing among a plurality of locations, including residences and commercial settings. Communication system 300 can be overlaid or operably coupled with communication system 100 as another representative embodiment of said communication systems. Various devices can be utilized for communicating and managing the media services that are presented at the residence, including gateways, DSLAMs and so forth. For instance, a gateway 104 can be coupled with a STB 106 that presents media content, including video conferences, on a display device 108. A Video Conferencing (VC) device 109 can be in communication with the set top box to control various aspects of the video conferencing session.

In one embodiment, one or more lights 310 can be in communication with the VC device 109 so that the lights can be turned on and off and/or dimmed in order to obtain desired lighting at the location. The lights can be of various types to provide various lighting effects, such as variable incandescent dimmable lights. The VC device 109 can utilize various communication techniques, such as Power Line Communications over a power circuit 320. In one embodiment, the communication from the VC device 109 to the lights 310 is limited to control signals where the lights can have their own controllers for regulating light emissions based on the control signals. In another embodiment, the communication includes delivery of power to the lights 310. In another embodiment, light sensors (not shown) can be utilized for determining light levels in different areas of the location.

System 300 can include a video camera 350 for capturing video and audio content at the location which is then transmitted to other locations for display on TV's and the like. The video camera 350 can also be utilized for capturing images of the location. The images can then be analyzed by the VC device 109 to determine lighting needs to enhance the video that is received by the other locations. In one embodiment, the VC device 109 can cycle through each available light, including cycling through levels of dimming of the light, and capture images, which are then analyzed to determine the illumination or lighting contribution of the particular light. Using this technique, the VC device 109 can determine which lights to utilize and what level of dimming to utilize so that a desired lighting effect can be provided to the location during the video conference.

The determination of the desired lighting effect and the necessary adjustments to each of the lights can be based on a lighting model that is generated by the VC device 109. The lighting model 109 can be generated for different times of the day, different times of the year and so forth. In one embodiment, the model can utilize previously captured data to facilitate generation of the model and/or adjustment of the lights. For instance, one or more previous images and lighting calculations can be relied upon to adjust the lights where those previous images and calculations are based on common variables such as time of day or time of year. In another embodiment, the VC device 109 can utilize pulsing of the lights in determining the model and/or adjusting the lights.

In one embodiment, the VC device 109 can adjust the lights based on imaging analysis that is based on segments of the location and/or participants in the video conference. For instance, the lighting contribution of each of the lights can be determined with respect to each of a group of segments (areas) of the video conference location (e.g., the conference room). In another embodiment, segments can be prioritized so that the lighting in one segment takes priority over another segment. For instance, the VC device 109 can determine that a first segment in which each of the participants is seated in the conference room is more significant than a second segment in which there are no conference participants. The lights can have different effects on the first and second segments. The VC device 109 can adjust the lights so that a more favorable lighting effect is provided for the first segment even though this adjustment results in a less favorable lighting effect for the second segment.

In one embodiment, the VC device 109 can determine undesirable effects resulting from the lighting, such as shadows and glare, based on an analysis of the captured images, including images captured before and during the video conference. As an example, it would be undesirable to have a shadow cast over a blackboard in the conference room. The VC device 109 can apply video pattern recognition to the captured image(s) to recognize the blackboard and then recognize any shadows cast over the blackboard. Adjustments can then be made to the lights to avoid or minimize the shadows on the blackboard. This technique can be employed during the video conference when the blackboard is being utilized.

Figure 4:
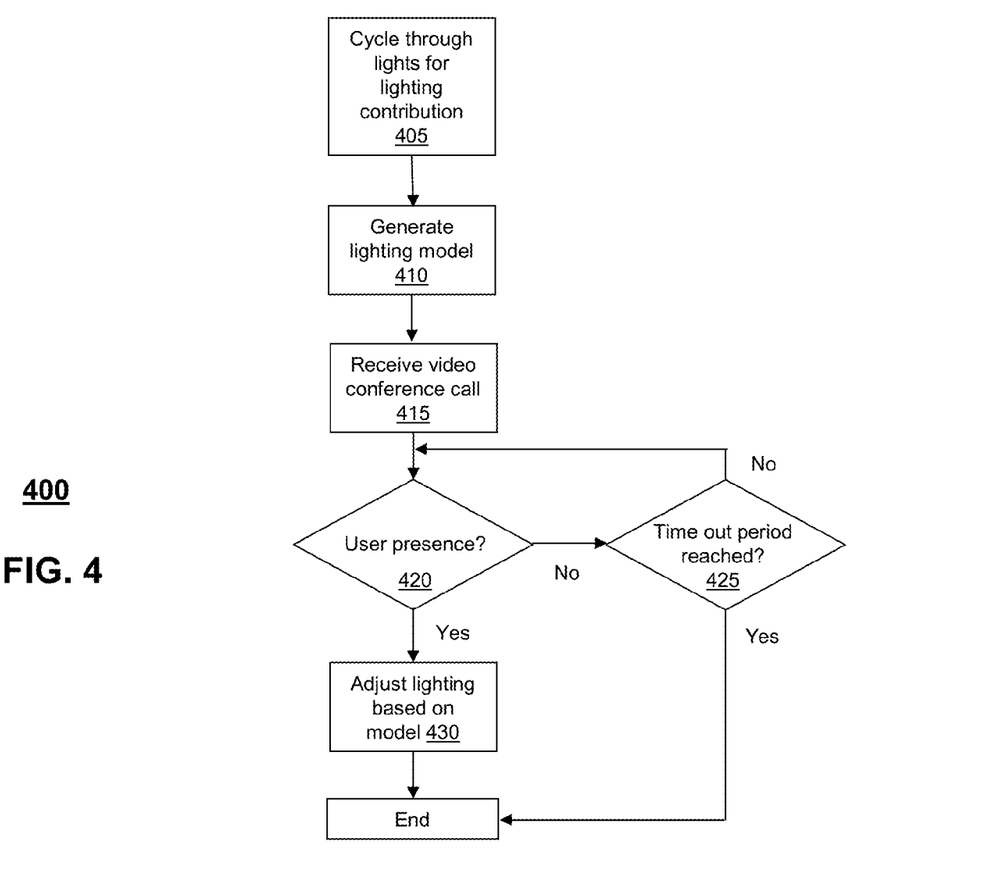
FIG. 4 depicts an illustrative embodiment of a method operating in portions of the communication systems of FIGS. 1 and 3.

FIG. 4 depicts an illustrative method 400 operating in portions of communication systems 100 and 300. Method 400 can begin with step 405 in which the VC device 109 determines available lights in a conference room or other location and then determines the contribution of each of the lights to the overall illumination of the room. The contribution determination can be performed by cycling through each of the lights (individually and/or in related groups), including over a dimming range. Images can be captured by the video conference camera during the cycling, and the images can be analyzed to determine illumination in the conference room for each of the lights. This data can be compiled for each of the available lights and then in step 410 a model can be generated for the overall illumination effects of the lights in the conference room. In one embodiment, models can be generated for different times of the day and different days of the year. In another embodiment, the model can be generated periodically so that the most recent model is relied upon for adjusting the lights.

In step 415, the STB 106 can receive a video conference call. The VC device 109 in step 420 can determine user presence. The user presence can be determined through capturing images of the conference room and performing image pattern recognition to detect the presence of the user in the room, such as by comparing to a base image that is known to be absent of any user. In another embodiment, motion sensors can be utilized to detect user presence. Other techniques can also be utilized, such as noise detection. In one embodiment, a time out period can be implemented for determining the user presence as in step 425. The time out period can allow a user time to enter the video conference and answer the video conference call. The detection of user presence allows system 300 to illuminate the conference room to a desired effect without actuation by the user, while efficiently utilizing energy (i.e., keeping the lights off) in the absence of the video conference call occurring.

If user presence is detected then in step 430 the VC device 109 can adjust the room illumination based on the generated lighting model. The adjustments can be made to one or more of the lights in the conference room and can include turning the lights on or off, as well as controlling the level of dimming of the lights. The light adjustments can be implemented using a number of techniques, including transmitting control signals from the VC device 109 over the power lines to the lights using PLC protocol. In one embodiment, the VC device 109 can be a multi-mode device for communicating with the lights using a number of different communication protocols, including PLC, IEEE 802.11 and so forth. The VC device 109 can detect the communication modes for each of the lights and then communicate via that particular detected mode. In another embodiment, the lights can be multi-mode devices so that the VC device 109 can utilize different communication modes, such as if a first mode is in failure.

Upon reviewing the aforementioned embodiments, it would be evident to an artisan with ordinary skill in the art that said embodiments can be modified, reduced, or enhanced without departing from the scope and spirit of the claims described below.

In one embodiment, the light adjustments can be based on identified image components. For instance, images can be captured and the face of a conference participant can be detected. The detected face can then be analyzed for the lighting effect on the face and the lights can be adjusted based on the analysis. As an example, face recognition techniques can be utilized and then the face can be segmented (such as right and left sides). The segments can be compared for equal illumination and light adjustments can be made to provide the desired illumination.

In another embodiment, color balancing can be performed based on the captured images. In these examples, the video camera can be utilized for providing the video and audio content during the video conference, as well as providing a desired illumination effect for the conference room. In another embodiment, the light sensitivity of the video camera can be adjusted based on the implemented lighting scheme. For example, the VC device 109 can generate a model through the cycling technique described above and adjust the lights based on the model when the video conference call is initiated. The video camera can then adjust its own light sensitivity based on the implemented lighting effect.

In one embodiment, the exemplary system can have a plurality of lights in a TV room with at least a portion not being wired for automatic control. In this example, a user can implement a manual lighting calibration scheme. For instance, using screen or audio commands, the VC lighting management system can guide the user through a series of steps for each light in the room. Steps can include, for example, (a) turn off all room lights, close all drapes/blinds, and sit in the primary speaker location. After the system registers the lighting of the room sectors, it can go to the next step: (b) turn on the first light and be seated again. This would continue until all of the room lights had been tried. Then the system can determine and recommend which lights should be used for a video conference for best result. The set-up could be done during the day and at night, since the results are likely to be different. In one embodiment, the system can instruct the user to hold a white object (e.g., a white sheet of paper) in front of his or her face, so the white balance of the camera can be adjusted.

Other suitable modifications can be applied to the present disclosure without departing from the scope of the claims below. Accordingly, the reader is directed to the claims section for a fuller understanding of the breadth and scope of the present disclosure.

Figure 5:
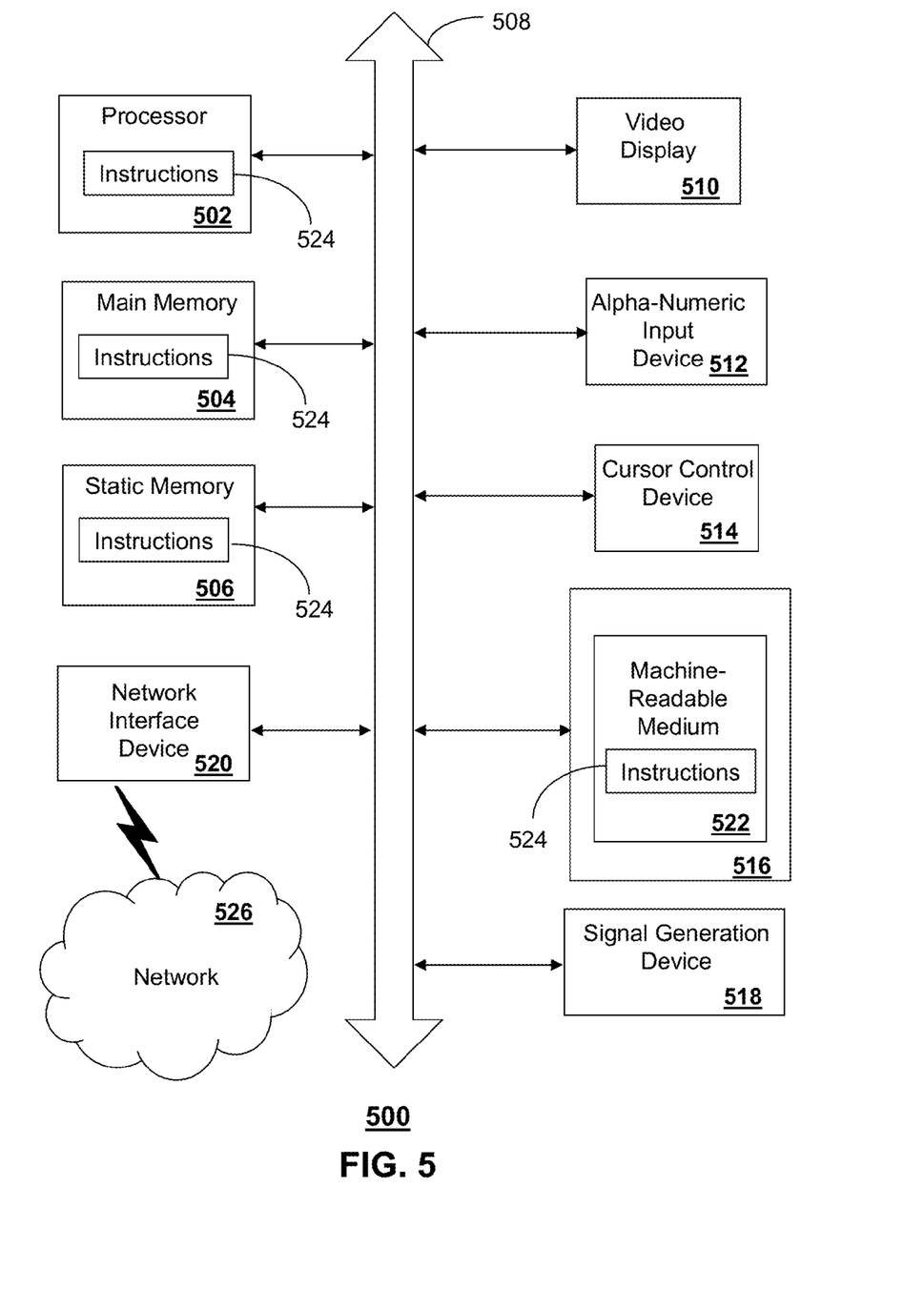
FIG. 5 is a diagrammatic representation of a machine in the form of a computer system within which a set of instructions, when executed, may cause the machine to perform any one or more of the methodologies discussed herein.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. A machine-readable storage device, comprising instructions, wherein responsive to executing the instructions, a processor performs operations comprising:
  performing an initial calibration, wherein the calibration comprises:

individually cycling through an individual illumination of each light of a plurality of lights in a room;

dimming a lighting level of each light of the plurality of lights during the individual cycling through different dimming levels; and capturing images of the room for each of the individual illuminations of each light during the cycling including at the different dimming levels, the images being captured by a video camera to obtain captured images for each level of the cycling for each light of the plurality of lights;

determining a lighting contribution for each light of the plurality of lights based on an analysis of the captured images during the cycling;

generating an illumination model based on the lighting contribution for each light of the plurality of lights based on the lighting contribution for each of the plurality of lights at the different dimming levels; and providing control signals for illumination one of the plurality of lights based on the illumination model during a video conference call that utilizes the video camera, the video conference call utilizing an interactive television network.

2. The machine-readable storage device of claim 1, wherein the illumination model prioritizes segments of a location of the video conference based on a seating arrangement of room, and wherein the generating of the illumination model is based in part on pulsing of the plurality of lights.

3. The machine-readable storage device of claim 1, wherein the operations further comprise adjusting one of the plurality of lights based on lighting effects on identified image components, wherein the identified image components comprise a face of a conference participant.

4. The machine-readable storage device of claim 1, wherein the operations further comprises:

detecting an undesired lighting condition as a detected undesired lighting condition during the video conference call using a lighting condition image captured by the video camera; and adjusting one of the plurality of lights based on the detected undesired lighting condition as a light adjustment.

5. The machine-readable storage device of claim 4, wherein the light adjustment to the one of the plurality of lights is based on the undesired lighting condition and the illumination model.

6. The machine-readable storage device of claim 1, wherein the operations further comprise:

detecting a target area in the room using a target image captured by the video camera;

detecting an undesired lighting condition as a detected undesired lighting condition associated with the target area during the video conference call using a lighting condition image captured by the video camera; and adjusting one of the plurality of lights based on the detected undesired lighting condition.

7. The machine-readable storage device of claim 1, wherein the illumination of the one of the plurality of lights is based on control signals transmitted via a power line communication protocol.

8. The machine-readable storage device of claim 1, wherein the operations further comprise detecting a presence of a user in the room, wherein the illumination of the one of the plurality of lights based on the illumination model occurs only after the detection of the presence of the user.

9. An apparatus, comprising:

a memory to store instructions; and a controller circuit coupled with the memory, wherein responsive to executing the instructions, the controller performs operations comprising:

performing an initial calibration by illuminating a plurality of lights in a room;

performing a dimming operation during the initial calibration, the dimming operation comprising cycling through different individual dimming levels for each light of the plurality of lights;

capturing images of the room for each of the individual dimming levels of each light during the cycling;

generating an illumination model for the plurality of lights associated with the room based on a lighting contribution for each of the plurality of lights determined from an analysis of the images; and providing for illumination of one of the plurality of lights based on the illumination model during a video conference call, the video conference call using an interactive television network.

10. The apparatus of claim 9, wherein the illumination model prioritizes segments of the room based on a seating arrangement of room and an associated illumination value of the illumination model.

11. The apparatus of claim 10, wherein the illumination model accounts for a light condition relative to a time of day.

12. The apparatus of claim 9, wherein the controller circuit is adapted to detect presence of a user in the room, and wherein the illumination of the one of the plurality of lights based on the illumination model occurs only after the detection of the presence of the user.

13. The apparatus of claim 9, wherein the controller circuit is adapted to adjust one of the plurality of lights based on lighting effects on identified image components.

14. The apparatus of claim 9, wherein the controller circuit is adapted to perform white balancing.

15. The apparatus of claim 9, wherein the capturing is performed via a video camera located in the room, and wherein a light sensitivity of the video camera is adjusted based on the illumination model.

16. A method, comprising:

cycling through an illumination of each light of a plurality of lights, wherein the plurality of lights are each located in a room, and wherein the cycling comprises illuminating each light at individual dimming levels;

obtaining images of the room captured, by a video camera, wherein the video camera is adapted for use in conducting a video conference call, and wherein the images are obtained during the cycling to capture a contribution of each light of the plurality of lights at the individual dimming levels;

determining, by a processor, a lighting contribution for each of the plurality of lights associated with the room based on application of pattern recognition analysis to the images during the cycling; and generating an illumination model for the plurality of lights based on the lighting contribution for each of the plurality of lights.

17. The method of claim 16, comprising providing control signals for illuminating one of the plurality of lights based on the illumination model during a video conference call that utilizes a video camera, the video conference call being implemented using an interactive television network.

18. The method of claim 16, comprising:

detecting a presence of a user in the room; and providing control signals for illuminating one of the plurality of lights based on the illumination model only after the detection of the presence of the user.

19. The method of claim 16, comprising:
presenting, by the processor, instructions for manually illuminating a group of lights that were not illuminated during the cycling, as a manual illumination;
obtaining images of the room captured by the video camera during the manual illumination; and
presenting, by the processor, instructions indicating a portion of the group of lights to be illuminated during the video conference call.

20. The method of claim 16, comprising:
detecting a target area in the room using one of the images captured by the video camera;
detecting an undesired lighting condition associated with the target area during the video conference call using one of the images captured by the video camera; and
adjusting one of the plurality of lights based on the undesired lighting condition.

\* \* \* \* \*